SIGNAL TRANSMISSION SYSTEM

Filed Feb. 6, 1951

INVENTOR
W. J. ALBERSHEIM
BY B. F. Stoddard
ATTORNEY

Aug. 10, 1954 W. J. ALBERSHEIM 2,686,256

SIGNAL TRANSMISSION SYSTEM

Filed Feb. 6, 1951 2 Sheets-Sheet 2

INVENTOR
W. J. ALBERSHEIM
BY B. F. Stoddard
ATTORNEY

Patented Aug. 10, 1954 2,686,256

UNITED STATES PATENT OFFICE 2,686,256

SIGNAL TRANSMISSION SYSTEM

Walter J. Albersheim, Interlaken, N. J., assignor to Bell Telephone Laboratories, Incorporated, New York, N. Y., a corporation of New York Application February 6, 1951, Serial No. 209,681

7 Claims. (Cl. 250—6)

Figure 1:
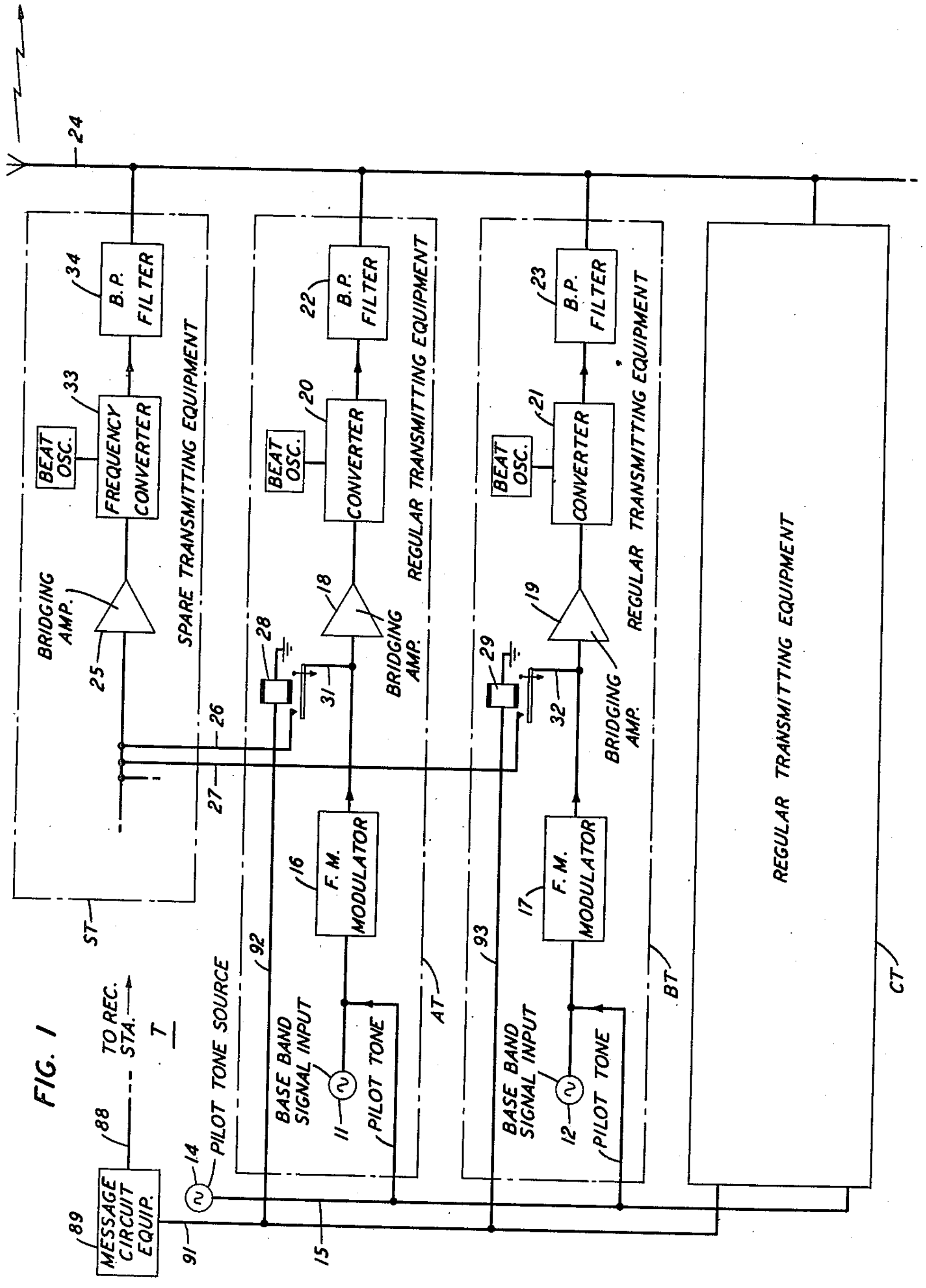

This invention relates to signal transmission systems and, more particularly, to means for employing additional transmitting facilities in a signal transmission system whenever the receptionof signals transmitted by regular transmitting facilities becomes impaired.

As is known in the art, signals transmitted over signal transmission systems are subject to distortion from various causes with the result that the accuracy of their reception is impaired. For example, signals transmitted over radiant energy transmission systems are subject to distortion produced by static and fading. Although the transmission of frequency-modulated signals avoids much of the trouble that would otherwise be caused by static, such signals are adversely affected by fading because, when the carrier fades, random noise, which was formerly submerged by the carrier, will be amplified to a greater extent thus increasing its relative effect. In addition, that type of fading which is known as selective fading produces non-linear distortion of frequency-modulated signals. In the case of frequency-division multiplex telephone signals transmitted over multichannel radiant energy systems, selective fading affects the signals in such a manner as to cause delay distortion thereof which is a function of the difference between the carrier frequency and the frequency of the deepest fade. Such delay distortion in turn produces severe intermodulation of this type of signal thereby resulting in deterioration of the quality of the received signals.

Accordingly, it is an object of this invention to provide a signal transmission system with spare transmitting facilities for use whenever the reception of signals transmitted by the regular transmitting facilities becomes impaired.

Another object of this invention is to provide a signal transmission system with control means for switching a spare transmission channel into service whenever the reception of signals received over the regular channel becomes impaired.

An additional object of the invention is to provide a signal transmission system with improved means for determining when the quality of signals received thereover is liable to be impaired.

These and other objects of the invention are accomplished by supplying a signal transmission system with spare transmitting facilities which are automatically switched into use when the quality of service provided by regular transmitting facilities becomes subject to impairment. In applying the invention to a radiant energy signal transmission system, the spare transmitting facilities utilize a frequency channel which is sufficiently separated from the regular channel as to be free from substantially all distortion and noise caused by a selective fade in the regular channel, since, as was stated above, delay distortion produced by selective fading is a function of the difference between the carrier frequency and the frequency of the deepest fade. In order to provide a switching initiator criterion for determining when the transmission of signals should be switched from the regular channel to the spare channel, pilot tone energy having frequencies outside the frequency range of the signaling energy is transmitted along with the signaling energy and the distortion products of the received pilot tone energy are separatedly observed. If desired, the harmonics and intermodulation products of the signals can be used as a criterion for distortion. However, it is preferable to employ pilot energy having frequencies sufficiently close to the frequencies of the regular signaling energy as to render the pilot energy subject to substantially the same non-linear distortion as the regular signaling energy. Since noise is random, it also extends into the pilot frequency intermodulation band. Therefore, a switching criterion based on increase of baseband noise in the pilot frequency intermodulation band will be equally responsive to modulation noise and to random noise caused by carrier loss due to fades or to failure of transmitting equipment.

Figure 2:
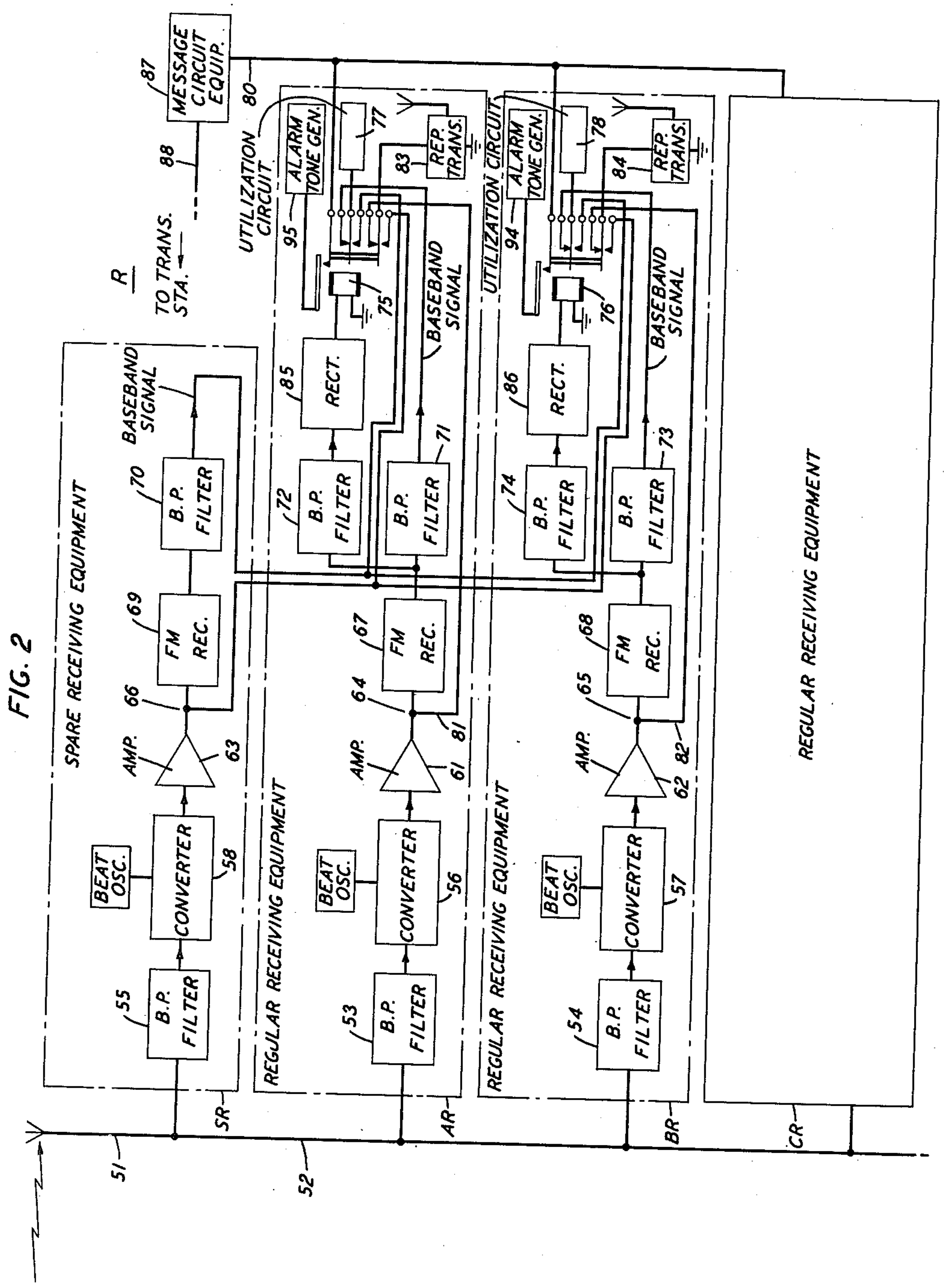

These and other features of the invention are more fully discussed in connection with the following detailed description of the drawing in which:

Fig. 1 is a schematic circuit diagram of a transmitting station in a multichannel radiant energy signaling system; and Fig. 2 is a schematic circuit diagram of a receiving station in this system.

In Fig. 1, the signal transmitting station T is shown to be provided with two transmitting equipments AT and BT, which are shown in detail, for use with two regular transmitting channels. It is also shown to be provided with a third transmitting equipment indicated by the block CT for use with a third regular transmitting channel. For the sake of simplicity, this third transmitting equipment CT is substantially omitted from the following description as its operation is the same as that of the equipments AT and BT. It is to be understood that the invention is not limited to this specific number of regular transmitting equipments as a smaller or larger number may be employed if desired. The station T is also provided with a spare transmitting equipment ST. As is shown in the drawing, the baseband signaling energy inputs for supplying modulating signals to the transmitting equipments AT and BT are indicated by terminals 11 and 12, respectively. The baseband signaling energy from the inputs 11 and 12 may comprise television signals or frequency-division multiplex telephone signals superimposed on subcarrier energy. Pilot tone energy from a source 14 is supplied over a common pilot tone bus 15 to each of the transmitting equipments AT and BT. This pilot tone energy may comprise one or more frequencies separated from the frequencies of the baseband signaling energy by an amount sufficient to cause their harmonics and principal intermodulation products to be outside the signaling band so that they can be readily segregated therefrom by band pass filters.

As is indicated in Fig. 1, the pilot tone energy is combined with the baseband signaling energy for application to conventional frequency modulators 16 and 17 for producing modulated intermediate frequency energy which in one embodiment of the invention is 70 megacycles. This modulated intermediate frequency energy is amplified in each of the transmitting equipments AT and BT by bridging amplifiers 18 and 19, respectively, and is then applied to the frequency converters 20 and 21, respectively, which constitute sources of carrier energy having frequencies within the microwave range. The carrier energy produced by the converter 20 occupies a position in the microwave range which is different from that occupied by the carrier energy produced by the converter 21. In one embodiment of the invention, these positions are spaced 20 megacycles apart. After passing through band pass filters 22 and 23, respectively, the microwave signalling energy from each of the transmitting equipments AT and BT is impressed upon a broad-band microwave transmitting antenna 24 for radiation therefrom. It should be noted that the filters 22 and 23 function to prevent interaction between the different signaling energies and also to produce an impedance match with the common antenna 24.

Since the spare transmitting equipment ST is provided for simultaneous use with any one of the regular transmitting equipments AT and BT, it does not require a separate baseband signaling input nor a separate frequency modulator. Instead, its first equipment unit is a bridging amplifier 25 which has its input coupled by conductors 26 and 27 to normally open contacts of alarm relays 28 and 29 located, respectively, in the regular transmitting equipments AT and BT. The armatures of the relays 28 and 29 are connected by conductors 31 and 32 to the outputs of the modulators 16 and 17, respectively. Whenever one of the normally unenergized alarm relays 28 and 29 becomes energized in a manner described hereinafter, it operates its armature to close its normally open contact thereby coupling the output from the associated modulator to the input of the bridging amplifier 25 which applies the amplified coupled intermediate frequency energy to a frequency converter 33. The converter 33 constitutes a source of carrier energy which occupies a position in the microwave range different from the positions of the carriers produced by the other converters 20 and 21 and which, preferably, has the same channel frequency separation as that mentioned above. The output from the converter 33 is passed through a band pass filter 34 and is then supplied to the antenna 24 in the same manner as the outputs from the other converters 20 and 21.

The microwave radio signals transmitted from the transmitting station T are received by the broad-band receiving antenna 51 at the receiving station R shown in Fig. 2. In Fig. 2, the receiving station R is provided with two regular receiving equipments AR and BR that are shown in detail and with a third regular receiving equipment indicated by a block CR. As was the case with the transmitting station T, it is to be understood that the receiving station R may be provided with a smaller or larger number of receiving equipments. For purposes of simplicity, the receiving equipment CR is substantially omitted from the following description as its operation is the same as that of the receiving equipments AR and BR. The receiving station R is also provided with a spare receiving equipment SR. As in indicated in Fig. 2, the signals received by the antenna 51 are delivered over a common radio frequency bus 52 to band pass filters 53, 54, and 55 located at the inputs of the receiving equipments AR, BR, and SR, respectively. These filters 53, 54, and 55 constitute channel separation filters since they are each designed to pass only the signaling energy from a different one of the microwave channels. Accordingly, the filter 53 permits signaling energy that originated at the transmitting equipment AT to enter the receiving equipment AR, the filter 54 passes signaling energy produced by the transmitting equipment BT into the receiving equipment BR, and the filter 55 admits into the spare receiving equipment SR signaling energy from the spare transmitting equipment ST.

The radio frequency energy thus admitted into the several receiving equipments AR, BR, and SR is stepped down to a common intermediate frequency, such as 70 megacycles, by the respective converters 56, 57, and 58. The outputs from the converters 56, 57, and 58 are amplified by amplifiers 61, 62, and 63, respectively, to a level suitable for bridging connections and are then delivered to the junction points 64, 65, and 66, respectively. In each of the receiving equipments AR, BR, and SR, the respective junction point 64, 65, and 66 is coupled to the input of a frequency modulation radio receiver 67, 68, and 69 respectively. The output of the radio receiver 69 in the spare receiving equipment SR is coupled to the input of a bandpass filter 70 which is designed to pass the baseband signaling energy applied thereto by the radio receiver 69. In the regular receiving equipments AR and BR, the output from the radio receiver 67 is supplied in parallel to two band pass filters 71 and 72, and the output from the radio receiver 68 is similarly supplied to two parallel bandpass filters 73 and 74. Filters 71 and 73 are so designed as to pass only the baseband signaling energy from their respective signaling channels whereas the filters 72 and 74 are so designed as to pass only the pilot tone distortion products from the same respective signaling channels.

Each of the regular receiving equipments AR and BR is provided with a normally unenergized relay 75 and 76, respectively. The relays 75 and 76 are preferably sequence relays as each is so designed that, when it is energized, its armature moves into engagement with its associated contact a brief interval of time before its two associated contact springs move into engagement with their lower contacts. Since the relays 75 and 76 are normally unenergized, the baseband signal outputs from the filters 71 and 73 are normally connected over the top contact springs and upper contacts of relays 75 and 76, respectively, to conventional utilization circuits indicated by the blocks 77 and 78, respectively. Similarly, intermediate frequency energy from the junction points 64 and 65 in the receiving equipments AR and BR, respectively, is normally supsupplied over the conductors 81 and 82 and the lower contact springs and associated upper contacts of relays 75 and 76 to conventional repeating transmitters 83 and 84, respectively.

The outputs from the filters 72 and 74, which comprise the pilot tone distortion products that are employed as switching initiator criterions, are rectified by the rectifiers 85 and 86, respectively. The direct-current outputs from the rectifiers 85 and 86 are applied to the windings of the sequence relays 75 and 76, respectively. It should be noted that the relays 75 and 76 are so designed that they will not operate their armatures until the level of the energy applied to their windings rises above an assigned value.

If it be assumed that the transmission characteristics of the channels employed by the regular transmitting equipments AT and BT are satisfactory and that signals transmitted thereover are being accurately received, then it follows that the level of the distortion products passed by the filters 72 and 74 will be so low that the magnitude of the direct-current outputs from the rectifiers 85 and 86 will be insufficient to cause the sequence relays 75 and 76 to operate their armatures. However, if a selective fade occurs in a portion of the frequency spectrum near the position occupied, for example, by the carrier employed by the transmitting equipment AT, then the level of the associated pilot tone distortion products will rise with the result that the level of the direct-current output from the rectifier 85 will be of sufficient magnitude to cause the associated sequence relay 75 to move its armature into engagement with its associated contact.

The engagement of the armature of the sequence relay 75 with its contact connects an alarm tone generator 95 to the alarm bus 80 leading to conventional message circuit equipment 87. The alarm tone produced by the generator 95 will now be transmitted by the message circuit equipment 87 over a message circuit 88, which may be of any suitable design, extending to conventional message circuit equipment 89 at the transmitting station T. The message circuit equipment 89 in turn delivers the alarm tone energy to an alarm bus 91 which is connected by conductors 92 and 93 to the windings of the alarm relays 28 and 29, respectively. It should be noted that the armature of the sequence relay 76 in the receiving equipment BR is connected to a similar alarm tone generator 94 which is designed to produce a tone having a frequency which is different from the tone produced by the generator 95.

The alarm relays 28 and 29 are so tuned as to be frequency selective; that is, only the alarm relay 28 will respond to the alarm tone produced by the generator 95 and, similarly, only the alarm relay 29 will respond to the alarm tone produced by the generator 94. Both of these alarm relays 28 and 29 are preferably of the slow-to-release type having a delay period of about 15 seconds after the level of their input energy has fallen below the operating threshold. This hold-over feature prevents chattering of the armatures of the relays 28 and 29 in the event the level of their respective alarm signal is at or near their operating threshold.

Under the circumstances set forth above, the alarm relay 28 will operate its armature to connect the conductor 31 extending from the output of the intermediate frequency modulator 16 to the conductor 26 leading to the input of the bridging amplifier 25. In this manner, the intermediate frequency input of the spare transmitting equipment ST is connected in parallel with the intermediate frequency input of the regular transmitting equipment AT with the result that signals from the baseband input 11 will now be transmitted simultaneously by both the regular transmitting equipment AT and the spare transmitting equipment ST.

At about this time, the two contact springs of the sequence relay 75 at the receiving station R will be moved downward to engage their respective lower contacts. This actuation of the upper contact spring of relay 75 disconnects the input of the utilization circuit 77 from the output of the baseband signal filter 71 in the regular receiving equipment AR and connects it instead to the output of the baseband signal filter 70 in the spare receiving equipment SR. Similarly, the actuation of the lower contact spring of relay 75 disconnects the repeating transmitter 83 from conductor 81 leading to the output of the intermediate frequency amplifier 61 in the regular receiving equipment AR and connects it instead to an obvious circuit extending to the junction point 66 which is coupled to the output of the intermediate frequency amplifier 63 in the spare receiving equipment SR. As was stated above, the armature of relay 75 is moved into engagement with its associated contact a brief interval of time before the associated contact springs are moved into engagement with their lower contacts. Due to this difference in operating time, the utilization circuit 77 and the repeating transmitter 83 are not switched to the spare receiving equipment SR until the alarm tone from the generator 95 has arrived at the transmitting station T and has energized the alarm relay 28 to place the spare transmitting equipment ST in an operative condition.

A similar procedure is followed in regard to the other transmitting and receiving equipments whenever the level of their respective segregated distortion products rises above the operating threshold of their respective sequence relays.

This particular embodiment of the invention has been presented for the purpose of describing the principles and features of operation of the invention. It is to be understood that the invention is not restricted to a radiant energy signaling system but may be used in other types of signaling systems. It is to be further understood that various modifications thereof may be made without exceeding the scope of the invention as defined in the claims appended hereto. For example, the invention may be applied to a two-way radiant energy signaling system by duplicating at each transmitting-receiving station the equipment shown in the drawing for each direction of transmission. In such an embodiment of the invention, one of the return channels could be utilized as a message circuit for the alarm signals, thereby eliminating the need for a separate message circuit. Also, each alarm tone generator could be coupled to a modulator for modulating the pilot tone energy which would then function as a carrier of the alarm tone. If this were done, then the station at the other end of the system could be provided with an additional demodulator and band pass filter for separating the alarm tone energy from the pilot tone energy for application to the respective alarm relay.

What is claimed is:

1. In a signalling system, a plurality of regular signal transmission channels each being subject to impairment of service, a substantially equivalent parallel and independent transmission channel serving as a spare, a plurality of sources of signals at the transmitting end of said regular and spare channels, means for normally activating each of said regular channels with the signals from a respectively different one of said sources, means at the receiving end of said regular channels for receiving signals transmitted thereover and for examining the quality of said received signals, control means for effecting the activation of the spare channel with the same signals that are simultaneously activating any one of said regular channels, said control means being normally disabled, enabling means responsive to deterioration of the quality of signals received over any one of said regular channels when impaired for enabling said control means to activate the spare channel with the same signals that are simultaneously activating said impaired channel, said control means including a plurality of frequency-selective means at the transmitting end of said regular channels, each of said frequency-selective means being individual to one of said regular channels, and wherein said enabling means includes a plurality of tone generators at the receiving end of said regular channels, the tone from each generator having a frequency that is different from the frequencies of the tones from the other of said generators, each of said generators being associated with a respectively different one of said regular channels, each of said frequency-selective means being tuned to only the frequency of the tone from a respectively different one of said generators, and transmitting means responsive to deterioration of the quality of signals received over any one of said regular channels when impaired for transmitting the tone from the generator associated with said impaired regular channel to all of said frequency-selective means.

2. A radiant energy signaling system having a plurality of radiant energy signaling channels allotted thereto, one of said channels being a regular signaling channel and another of said channels being a spare signaling channel, said system comprising in combination a transmitting station having a source of signals and means for transmitting said signals over said regular channel, control means at said transmitting station for transmitting said signals over said spare channel simultaneously with their transmission over said regular channel, said control means being normally unoperated, a receiving station for receiving signals transmitted over said channels, said received signals being subject to impairment by distortion products, means at said receiving station for segregating said distortion products from said received signals, operating means responsive to an increase in the level of said segregated distortion products for effecting the operation of said control means, a utilization circuit at said receiving station, normally enabled means at said receiving station for applying signals received over said regular channel to the input of said utilization circuit, normally disabled means at said receiving station adapted when enabled to apply signals received over said spare channel to the input of said utilization circuit, and an instrumentality for effecting the disablement of said normally enabled means and for effecting the substantially simultaneous enablement of said normally disabled means, said instrumentality being responsive to an increase in the level of said segregated distortion products above an assigned value.

3. A signal transmission system comprising in combination a regular signal transmission channel subject to impairment of service, a substantially equivalent parallel and independent transmission channel serving as a spare, a source of electric signaling energy having frequencies within an assigned frequency band, a source of pilot electric energy having a frequency outside said assigned frequency band, means for combining said pilot energy with said signaling energy, means at the transmitting end of said channels for normally activating only the regular transmission channel with said combined energies, means at the receiving end of said regular channel for receiving said combined energies and for separating therefrom distortion products of said pilot energy, control means at the transmitting end of said channels for effecting the activation of the spare channel with the same signaling energy that is simultaneously activating the regular channel, said control means being normally disabled, and enabling means for employing said separated distortion products to effect the enablement of said control means.

4. A signal transmission system in accordance with claim 3 wherein said enabling means include transmitting means for transmitting electric wave energy from the receiving end of said channels to said control means, and electroresponsive means responsive to changes in the level of said separated distortion products for controlling said transmitting means.

5. A radiant energy signaling system comprising in combination a transmitting station and a receiving station, said transmitting station having first and second sources of carrier energy and means for continuously radiating both of said carrier energies for substantially simultaneous reception by said receiving station, the position in the frequency spectrum of the first of said carriers being different from that of the second, a source of modulating potentials, modulating means at the transmitting station for modulating the first of said carriers with said modulating potentials for radiation therewith, demodulating means at the receiving station for separating the transmitted modulating potentials from the received modulated carrier energy, said transmitted modulating potentials being subject to impairment by intermodulation products, separating means at the receiving station for separating said intermodulation products from said separated modulating potentials, normally unoperated control means adapted when operated to effect the modulation of the second of said carriers with the same modulating potentials that are simultaneously modulating the first of said carriers, and operating means actuated only when the magnitude of said separated intermodulation products exceeds an assigned value for effecting the operation of said control means.

6. A radiant energy signaling system comprising in combination a transmitting station and a receiving station, said transmitting station including a source of regular carrier energy, a source of spare carrier energy having a frequency different from that of said regular carrier energy, a source of signaling energy having frequencies within an assigned band, a source of pilot tone energy having frequencies outside said assigned band, means for modulating said regular carrier with both said pilot tone energy and said signaling energy simultaneously, means for radiating both said modulated regular carrier and said spare carrier simultaneously for reception by said receiving station, first and second demodulators at said receiving station, means for applying only said received modulated regular carrier to the first demodulator, means for applying only said received spare carrier to the second demodulator, separating means coupled to the output of the first demodulator for separating intermodulation products of said received pilot tone energy, rectifying means for rectifying said separated intermodulation products, a source of alarm tone energy at said receiving station, a transmission channel extending from the receiving station to the transmitting station, electroresponsive means coupled to the output of said rectifying means for effecting the transmission of said alarm tone energy over said transmission channel to the transmitting station whenever the level of said rectified intermodulation products exceeds an assigned value, and means at said transmitting station responsive to the reception thereat of said transmitted alarm tone energy for effecting the modulation of said spare carrier with both the same pilot tone energy and the same signaling energy that are simultaneously modulating the regular carrier.

7. A radiant energy signaling system in accordance with claim 6 and having a utilization circuit at said receiving station, said utilization circuit being coupled by said electroresponsive means to the output of said first demodulator whenever the level of said rectified intermodulation products is less than said assigned value and being alternatively coupled by said electroresponsive means to the output of said second demodulator whenever the level of said rectified intermodulation products exceeds said assigned value.

References Cited in the file of this patent

UNITED STATES PATENTS

| Number | Name | Date |
|---|---|---|
| 1,927,989 | Nyquist | Sept. 26, 1933 |
| 2,229,158 | Wilson | Jan. 21, 1941 |
| 2,281,035 | Green | Apr. 28, 1942 |
| 2,379,069 | Dysart | June 26, 1945 |
| 2,396,990 | Dysart | Mar. 19, 1946 |